United States Patent
Askander et al.

(10) Patent No.: US 8,864,879 B2
(45) Date of Patent: Oct. 21, 2014

(54) SYSTEM FOR RECOVERY OF AMMONIA FROM LEAN SOLUTION IN A CHILLED AMMONIA PROCESS UTILIZING RESIDUAL FLUE GAS

(76) Inventors: Jalal Askander, Knoxville, TN (US); Fred Kozak, Knoxville, TN (US)

( * ) Notice: Subject to any disclaimer, the term of this patent is extended or adjusted under 35 U.S.C. 154(b) by 275 days.

(21) Appl. No.: 13/435,303

(22) Filed: Mar. 30, 2012

(65) Prior Publication Data
US 2013/0255495 A1    Oct. 3, 2013

(51) Int. Cl.
*B01D 53/62* (2006.01)
*B01D 53/96* (2006.01)

(52) U.S. Cl.
CPC ............... *B01D 53/62* (2013.01); *B01D 53/96* (2013.01)
USPC ............... 95/165; 95/166; 95/169; 95/191; 95/204; 95/207; 95/227; 95/228; 95/236; 423/234

(58) Field of Classification Search
USPC .................................... 95/204, 158
See application file for complete search history.

(56) References Cited

U.S. PATENT DOCUMENTS

| | | | |
|---|---|---|---|
| 2,106,734 A | 2/1935 | Gollmar | |
| 2,043,109 A | 6/1936 | McKee et al. | |
| 2,487,576 A | 11/1949 | Meyers | |
| 2,608,461 A | 8/1952 | Frazier | |
| 2,878,099 A | 3/1959 | Breuing et al. | |
| 3,255,233 A | 6/1966 | Kunze et al. | |
| 3,923,955 A | 12/1975 | Fattinger | |
| 4,052,176 A * | 10/1977 | Child et al. | 95/161 |
| 4,515,760 A | 5/1985 | Lang et al. | |
| 4,847,057 A | 7/1989 | Brugerolle et al. | |
| 4,977,745 A | 12/1990 | Heichberger | |
| 4,999,031 A | 3/1991 | Gerhardt et al. | |
| 5,067,972 A | 11/1991 | Hemmings et al. | |
| 5,122,165 A * | 6/1992 | Wang et al. | 95/92 |
| 5,137,550 A | 8/1992 | Hegarty et al. | |
| 5,186,916 A | 2/1993 | Nevels | |
| 5,318,758 A | 6/1994 | Fujii | |
| 5,378,442 A | 1/1995 | Fujii et al. | |

(Continued)

FOREIGN PATENT DOCUMENTS

AU    648129    7/1992
AU    678622    6/1995

(Continued)

OTHER PUBLICATIONS

Kozak, Fred, Arlyn Petig, Ed Morris, Richard Rhudy, and David Thimsen. "Chilled ammonia process for CO2 capture." Energy Procedia. vol. 1 (2009) p. 1419-1426.*

(Continued)

*Primary Examiner* — Duane Smith
*Assistant Examiner* — Stephen Hobson
(74) *Attorney, Agent, or Firm* — Cynthia W. Flanigan

(57) ABSTRACT

Disclosed herein is a method comprising contacting a residual flue gas stream with a lean solution stream in an appendix stripper; where the residual flue gas stream comprises nitrogen, oxygen and moisture; and where the lean solution stream comprises ammonium, ammonium carbonate, ammonium bicarbonate and ammonium sulfate; forming a vapor phase that comprises ammonia vapor, water vapor, carbon dioxide and nitrogen; forming a liquid phase that comprises water, ammonium sulfate and ammonia; discharging the vapor phase to a capture system; and discharging the liquid phase to a direct contact cooler.

11 Claims, 2 Drawing Sheets

(56) References Cited

U.S. PATENT DOCUMENTS

| | | | |
|---|---|---|---|
| 5,427,759 A | 6/1995 | Heitmann | |
| 5,453,115 A | 9/1995 | Vuletić | |
| 5,462,583 A | 10/1995 | Wood et al. | |
| 5,599,508 A | 2/1997 | Martinelli et al. | |
| 5,648,053 A | 7/1997 | Mimura et al. | |
| 5,700,311 A | 12/1997 | Spencer | |
| 5,756,058 A | 5/1998 | Watanabe et al. | |
| 5,832,712 A | 11/1998 | Rønning et al. | |
| 5,853,680 A | 12/1998 | Iijima et al. | |
| 5,979,180 A | 11/1999 | Lebas et al. | |
| 6,027,552 A | 2/2000 | Ruck et al. | |
| 6,139,605 A * | 10/2000 | Carnell et al. | 95/164 |
| 6,210,467 B1 | 4/2001 | Howard | |
| 6,348,088 B2 | 2/2002 | Chung | |
| 6,372,023 B1 | 4/2002 | Kiyono et al. | |
| 6,458,188 B1 | 10/2002 | Mace | |
| 6,485,547 B1 | 11/2002 | Iijima | |
| 6,497,852 B2 | 12/2002 | Chakravarti et al. | |
| 6,506,350 B2 | 1/2003 | Cooper et al. | |
| 6,759,022 B2 | 7/2004 | Hammer et al. | |
| 6,764,530 B2 | 7/2004 | Iijima | |
| 7,022,296 B1 | 4/2006 | Khang et al. | |
| 7,083,662 B2 | 8/2006 | Xu et al. | |
| 7,128,777 B2 | 10/2006 | Spencer | |
| 7,160,456 B2 | 1/2007 | Järventie | |
| 7,255,842 B1 | 8/2007 | Yeh et al. | |
| 7,674,321 B2 * | 3/2010 | Menzel | 95/177 |
| 7,866,638 B2 * | 1/2011 | Neumann et al. | 261/115 |
| 2003/0045756 A1 | 3/2003 | Mimura et al. | |
| 2003/0140786 A1 | 7/2003 | Iijima | |
| 2004/0123736 A1 | 7/2004 | Torres, Jr. et al. | |
| 2004/0126294 A1 | 7/2004 | Cooper et al. | |
| 2005/0169825 A1* | 8/2005 | Cadours et al. | 423/220 |
| 2006/0178259 A1 | 8/2006 | Schubert et al. | |
| 2006/0204425 A1 | 9/2006 | Kamijo et al. | |
| 2007/0006565 A1 | 1/2007 | Fleischer et al. | |
| 2008/0072762 A1* | 3/2008 | Gal | 96/242 |
| 2008/0178733 A1 | 7/2008 | Gal | |
| 2008/0307968 A1 | 12/2008 | Kang et al. | |
| 2009/0101012 A1 | 4/2009 | Gal et al. | |
| 2009/0155889 A1 | 6/2009 | Handagama et al. | |
| 2009/0282977 A1 | 11/2009 | Koss | |
| 2012/0063975 A1 | 3/2012 | Koss et al. | |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| DE | 10 2005 033837 | 1/2007 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| EP | 1 967 249 | 9/2008 |
| EP | 2230000 | 9/2010 |
| GB | 271852 | 5/1926 |
| GB | 871207 | 6/1961 |
| GB | 899611 | 6/1962 |
| GB | 2331526 | 5/1999 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/09849 | 2/2002 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/072979 | 6/2008 |
| WO | 2008/094777 | 8/2008 |
| WO | 2008/101293 | 8/2008 |
| WO | 2008/144918 | 12/2008 |
| WO | 2010/053683 | 5/2010 |
| WO | 2010/110939 | 9/2010 |
| WO | WO 2010103392 A1 * | 9/2010 |

OTHER PUBLICATIONS

Herzog et al. "Advance Post-Combustion CO2 Capture" Clean air Task Force, Apr. 2009.*

Kirk-Othmer "Encyclopedia of Chemical Technology" vol. 2, 3rd ed, 1978, ISBN 0-471-02038-0 reproduced in "Ammonium Sulfate".*

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Enviromnental Tech. and Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for CO2 capture by aqueous ammonia", Fuel Processing Technology, vol. 86, No. 14-15, Oct. 1, 2005, pp. 1533-1546.

* cited by examiner

SYSTEM FOR RECOVERY OF AMMONIA FROM LEAN SOLUTION IN A CHILLED AMMONIA PROCESS UTILIZING RESIDUAL FLUE GAS

TECHNICAL FIELD

This disclosure relates to the recovery of ammonia in a chilled ammonia process. In particular, this disclosure relates to using a slipstream from the residual flue gas stream as an appendix stripping medium in the chilled ammonia process.

BACKGROUND

In the combustion of a fuel (e.g., coal, oil, peat, waste, biofuel, natural gas, or the like used for the generation of power or for the production of materials such as cement, steel or glass, or the like, a stream of hot flue gas (also sometimes known as process gas) is generated. Such a hot flue gas contains, among other components, carbon dioxide ($CO_2$).

A chilled ammonia process (CAP) is often used for the removal of carbon dioxide ($CO_2$) from a post-combustion flue gas stream. The chilled ammonia process provides a relatively low cost means for capturing and removing carbon dioxide from a gas stream, such as, for example, a post combustion flue gas stream.

In the chilled ammonia process, the absorption of carbon dioxide from a flue gas stream is achieved by contacting a chilled ammonia ionic solution with a flue gas stream containing carbon dioxide. This is generally accomplished in a capture system (also termed an "absorber system"). The ionic solution containing absorbed carbon dioxide is subsequently regenerated, whereby carbon dioxide is removed from the ionic solution, and the regenerated ionic solution is reused in the carbon dioxide absorption process. This is generally accomplished in a regeneration system. Thus, a circulating stream of ionic solution is formed, which circulates between the capture system and the regeneration system. The ionic solution may be composed of, for example, water, ammonia, ammonium sulfate, carbon dioxide and derivatives thereof.

Moisture in the flue gas can accumulate in the ionic solution as it circulates between the capture system and the regeneration system. In order to remove this moisture from the ionic solution, an appendix stripper configured as a gas-liquid contacting device, receives a portion of the circulating ionic solution. In this device, warm ionic solution is depressurized to form a gas phase containing the vapor of low boiling point components of the solution (primarily ammonia and carbon dioxide), and a liquid phase containing the high boiling point components of the solution. A portion of the gas phase compound is absorbed in the residual flue gas stripping medium and returned to the chilled ammonia process absorber vessels. The liquid phase containing the ammonium sulfate is sent to the direct contact cooler system for purge with the ammonium sulfate bleed stream.

The use of steam in the appendix stripper however involves operating temperatures which promotes dissociation of the ammonia sulfate into acidic compounds, which tends to corrode other equipment used in the gas-liquid separating device.

SUMMARY

Disclosed herein is a method comprising contacting a residual flue gas stream with a lean solution stream in an appendix stripper; where the residual flue gas stream comprises nitrogen, oxygen and moisture; and where the lean solution stream comprises ammonium, ammonium carbonate, ammonium bicarbonate and ammonium sulfate; forming a vapor phase that comprises ammonia vapor, water vapor, carbon dioxide and nitrogen; forming a liquid phase that comprises water, ammonium sulfate and ammonia; discharging the vapor phase to a capture system; and discharging the liquid phase to a direct contact cooler.

Disclosed herein is a system comprising a capture system; the capture system being operative to produce a residual flue gas stream by absorbing carbon dioxide from a flue gas stream by contacting it with an ionic solution comprising ammonia; a regeneration system in fluid communication with the capture system; the regeneration system being operative to remove carbon dioxide from the ionic solution to form a lean ionic solution; a direct contact heater; the direct contact heater being in fluid communication with the capture system and being operative to heat the residual flue gas stream; and an appendix stripper; the appendix stripper being operative to facilitate contact between the residual flue gas stream and the lean solution stream.

DETAILED DESCRIPTION

Disclosed herein is a chilled ammonia process for extracting carbon dioxide from a flue gas stream. The method advantageously uses an appendix stripper that uses a carbon dioxide depleted residual flue gas stream (hereinafter "residual flue gas stream") to strip ammonia and carbon dioxide from ionic solution. The carbon dioxide depleted residual flue gas stream is at a lower temperature than steam, which has hitherto been used in the appendix stripper.

Conventional solutions (i.e., previously existing solutions) depend on sensitive temperature control of the steam going to the reboiler. Operating experience has shown that the composition of the vapor phase is sensitive to the bottoms temperature, resulting in the over stripping of ammonia and in ammonia sulfate dissociation.

The use of the residual flue gas as the stripping medium (in lieu of steam) in the appendix stripper avoids the use of high temperatures brought about by the use of steam and prevents the dissociation of ammonium sulfate into its acidic components. This minimizes degradation of the liquid gas separation system. In addition, capital and operational costs associated with the use of steam and the use of the reboiler are reduced.

Figure 1:
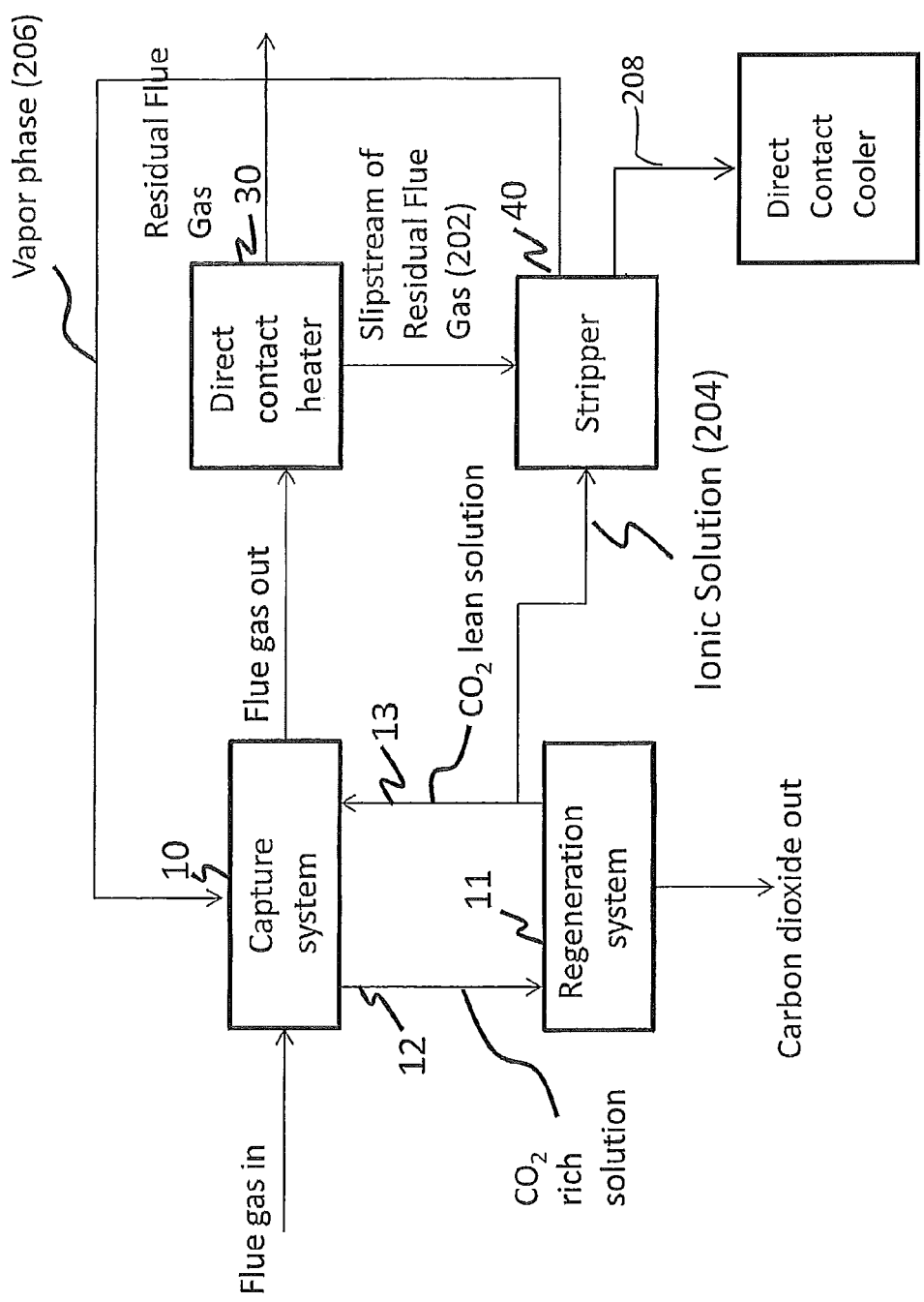
FIG. 1 depicts an exemplary liquid gas separation system that comprises a carbon dioxide capture system, a regeneration system and an appendix stripper.

FIG. 1 depicts an exemplary liquid gas separation system 4 that comprises a carbon dioxide capture system 10 (also known as an absorber), a regeneration system 11, a direct contact heater 30 and an appendix stripper 40, all of which are in fluid communication with one another. Another exemplary embodiment of a portion of the liquid gas separation system is depicted in the FIG. 2.

Figure 2:
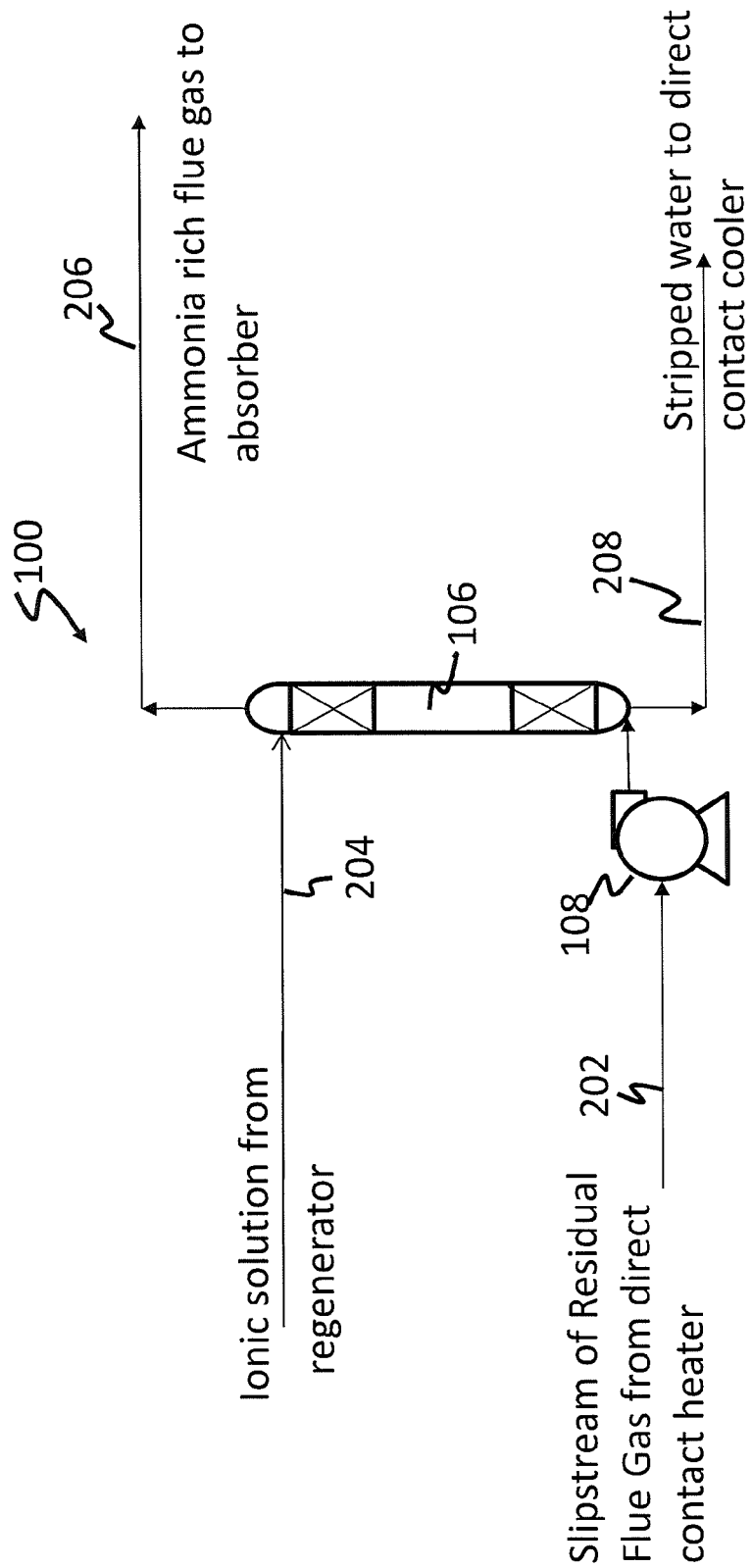
FIG. 2 depicts a stripping system comprising an appendix stripper that uses a blower to introduce flue gases into the bottom of the appendix stripper.

With reference now to both the FIGS. 1 and 2, a recycle loop for the ionic solution lies between the capture system 10 and the regeneration system 11. The ionic solution generally comprises an aqueous solution of ammonia. A portion of the lean ionic solution 204 is withdrawn and fed to the appendix stripper 40. In the appendix stripper, lean ionic solution is contacted with a residual flue gas stream from the direct contact heater 30 to strip light ends in the vapor phase—ammonia and carbon dioxide—from the lean ionic solution. In one embodiment, the appendix stripper comprises structured or random packing to facilitate mass transfer.

The capture system 10 captures and removes carbon dioxide from a flue gas stream by contacting it with a lean ionic solution 13. The lean ionic solution (which is so termed because it is lean in carbon dioxide) extracts carbon dioxide from the flue gas stream to form a carbon dioxide rich ionic solution 12 (hereinafter "rich ionic solution"). A residual flue gas stream 32 now substantially devoid of carbon dioxide is transported to a direct contact heater 30. A portion of the residual flue gas (a slipstream) is sent to the appendix stripper 40 as the stripping medium.

The appendix stripper 40 is designed to control liquid accumulation in the capture system 10 and to maintain an acceptable level of ammonium sulfate in the ionic solution. The appendix stripper 40 is arranged in fluid communication with, and configured to receive a portion of, the circulating ionic solution stream, separate the received ionic solution into an ammonia rich gas phase (a vapor phase (206)) and an ammonia lean liquid phase (a liquid phase (208)), and reintroduce the ammonia rich gas phase (206) into the capture system 10. In an exemplary embodiment, the ammonia rich gas phase (206) is reintroduced into the circulating ionic solution stream via the capture system 10. The ammonia lean liquid phase (208), consisting mainly of water is removed from the system. Ionic solution may be supplied to the appendix stripper 40 passively, e.g., by means of the internal pressure of the carbon dioxide removal system.

The direct contact heater 30 heats the residual flue gas stream for stack discharge to the atmosphere. Using the cooler residual flue gas stream as a stripping medium, prevents the loss of ammonia from the ionic solution and also minimizes the decomposition of the ammonium sulfate into its acidic components.

The regeneration system 11 is operative to treat the rich ionic solution 12 at a temperature and pressure to release carbon dioxide from the rich ionic solution. The carbon dioxide may then be sequestered or used for other purposes. The lean ionic solution 13 produced after the release of the carbon dioxide (from the rich ionic solution) is then recycled to the capture system 10. A portion of the lean ionic solution 13 (shown as the ionic solution (204) in the FIGS. 1 and 2) comprising water, ammonia, ammonium sulfate, carbon dioxide and derivatives thereof is then discharged to the appendix stripper 40 to remove the ammonia lean liquid phase as detailed above.

The discussion hereinafter pertains only to the FIG. 2. FIG. 2 displays a portion of the liquid gas separation system 100 that comprises an appendix stripper 106. The flue gases downstream of a power generation system comprises a boiler (not shown) are treated in a capture system (not shown) to remove carbon dioxide thereby producing a residual flue gas stream 202. A portion of the residual flue gas stream 202 (i.e., the slipstream) is discharged to the appendix stripper 106 via a direct contact heater (not shown) and an optional blower 108. The use of the blower 108 (e.g., a fan) slightly increases the pressure of the flue gas stream from the pressure with which it emanates from the direct contact heater.

The direct contact heater is used to heat the residual flue gas stream 202 to a temperature of about 25 to about 50° C., specifically about 30 to about 45° C. The residual flue gas stream 202 is used as a replacement for steam as the stripping medium in the appendix stripper 40. The residual flue gas stream 202 comprises nitrogen, oxygen and moisture and is used as a stripping medium and is introduced into the lower portion of the appendix stripper 106. The residual flue gas stream is introduced into the appendix stripper 106 at a pressure around atmospheric pressure.

A lean ionic solution stream 204 comprising ammonia, ammonium carbonate, ammonium bicarbonate and ammonium sulfate from the regenerator is also fed to the upper portion of the appendix stripper 106. The lean solution stream 204 is fed through a distribution header (not shown) into the appendix stripper where it contacts the residual flue gas stream. As a result of the contact between the lean solution stream 204 and the residual flue gas stream 202, a vapor phase 206 and a liquid phase 208 is formed. The vapor phase 206 is analogous to the ammonia rich gas phase detailed above and comprises ammonia vapor, water vapor, carbon dioxide and nitrogen and is taken off the upper portion of the appendix stripper 106. The vapor phase 206 may be recharged to the capture system. In an exemplary embodiment, the vapor phase 206 is routed to an injection grid in the capture system.

The bottoms in the appendix stripper 106 comprise the liquid phase 208, which contains water, ammonium sulfate and a low concentration of ammonia. This solution is discharged to a direct contact cooler (not shown) for discharge with other ammonium sulfate byproduct streams.

This system has a number of advantages. By returning the ammonia at a low temperature directly to the absorber, a significant energy benefit is achieved in terms of sensible heat (lower heat) and latent heat (no steam to condense). The ammonia stripping efficiency is greater than about 98%, specifically greater than about 99% and more specifically greater than about 99.5%. No steam is used for this process, thus minimizing or even eliminating the degradation of ammonium sulfate. No flue gas preheating is used. The process is conducted at nominal atmospheric pressure thus reducing costs of pressurizing the residual flue gas stream.

The invention is further illustrated by the following non-limiting examples.

EXAMPLE

Example 1

This example was conducted to determine the stripping efficiency of a system that uses an appendix stripper. The lean solution stream comprising a mixture of ammonium, ammonium carbonate, ammonium bicarbonate and ammonium sulfate was introduced into the top of the appendix stripper through a distribution header. The ammoniated solution contains ammonia ions in a concentration of 7.23 M. The residual flue gas stream from the direct contact heater comprising carbon dioxide, nitrogen and moisture is pressurized by the blower and introduced into the appendix stripper from the bottom. The residual flue gas stream is introduced at the bottom of the appendix stripper at a temperature of 25 to 50° C.

The residual flue gas stream and the lean solution stream thus travel through the appendix stripper in mutually opposed directions. The interaction between the flue gas stream and the lean solution stream results in the formation of a vapor phase and a liquid phase (also referred to as "bottoms") in the appendix stripper. The vapor phase comprises ammonia vapor, water vapor, carbon dioxide and nitrogen and is removed from the top of the stripper. The vapor phase is routed to a typical injection grid in the capture system.

The liquid phase comprises water, ammonium sulfate and a low concentration of ammonia (0.02 to 0.04 M) and is removed from the bottom of the appendix stripper and discharged to a direct contact cooler. The stripping efficiency is higher than 99%. No steam is required to accomplish this stripping efficiency.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method to control liquid accumulation in a carbon capture system, the method comprising:
   contacting a residual flue gas stream with a lean solution stream in an appendix stripper; where the residual flue gas stream comprises nitrogen, oxygen and moisture; and where the lean solution stream comprises ammonium, ammonium carbonate, ammonium bicarbonate and ammonium sulfate;
   forming a vapor phase that comprises ammonia vapor, water vapor, carbon dioxide and nitrogen;
   forming a liquid phase that comprises water, ammonium sulfate and a low concentration of ammonia;
   reintroducing the vapor phase to the carbon capture system; and
   discharging the liquid phase to a direct contact cooler for discharge with other ammonium sulfate byproduct streams.

2. The method of claim 1, where the residual flue gas stream is at a temperature of about 25 to about 50° C.

3. The method of claim 1, further comprising heating the residual flue gas stream in a direct contact heater prior to discharging it into the appendix stripper.

4. The method of claim 1, where the method does not use steam or electrical energy.

5. The method of claim 1, where the appendix stripper is operated at a pressure effective to facilitate circulation.

6. The method of claim 1, where the ammonium sulfate is not decomposed.

7. The method of claim 1, where the residual flue gas stream with the lean solution stream are introduced at opposite ends of the appendix stripper.

8. The method of claim 6, where the residual flue gas stream and the lean solution stream travel through the appendix stripper in opposing directions.

9. The method of claim 1, where the liquid phase comprises 0.02 to 0.04 M ammonia.

10. A method to control liquid accumulation in a carbon capture system comprising:
    contacting a carbon dioxide depleted residual flue gas stream with a lean ionic solution stream in an appendix stripper; where the residual flue gas stream comprises nitrogen, oxygen and moisture and is at a temperature of about 25° C. to 50° C.; and where the lean ionic solution stream comprises ammonium, ammonium carbonate, ammonium bicarbonate and ammonium sulfate and is at a temperature of about 100° C. to 150° C.;
forming an ammonium rich vapor phase that comprises ammonia vapor, water vapor, carbon dioxide and nitrogen;
forming an ammonium lean liquid phase that comprises water, ammonium sulfate and a low concentration of ammonia;
returning the vapor phase to the carbon capture system; and
discharging the liquid phase to a direct contact cooler and removing it from the system.

11. The method of claim 10 wherein the carbon dioxide depleted residual flue gas is introduced to the appendix stripper at nominal atmospheric pressure.

* * * * *